July 12, 1949.　　　　　K. G. FRANCIS　　　　　2,476,140
PROCESS FOR THE MANUFACTURE OF CRYSTALLINE VINYLIDENE
CHLORIDE POLYMER TUBING WHOSE WALLS DO NOT COHERE
Filed Aug. 11, 1948
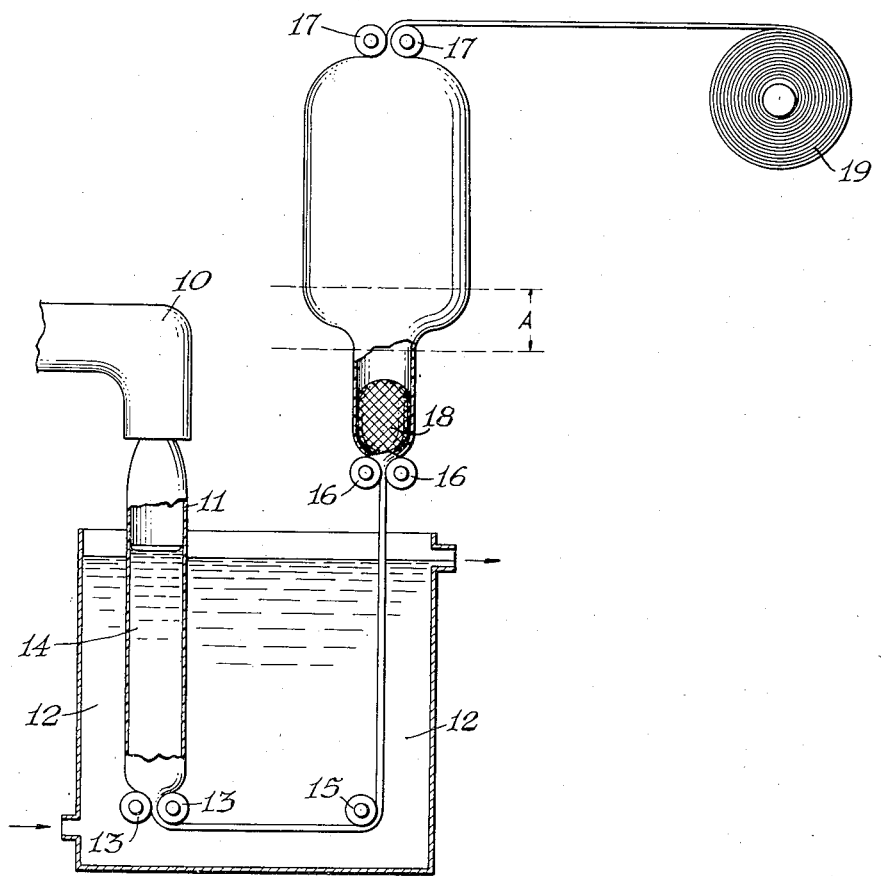
INVENTOR.
Kenneth G. Francis
BY
Griswold & Burdick
ATTORNEYS Patented July 12, 1949

2,476,140

UNITED STATES PATENT OFFICE 2,476,140

PROCESS FOR THE MANUFACTURE OF CRYSTALLINE VINYLIDENE CHLORIDE POLYMER TUBING WHOSE WALLS DO NOT COHERE

Kenneth G. Francis, Bay City, Mich., assignor to The Dow Chemical Company, Midland, Mich., a corporation of Delaware Application August 11, 1948, Serial No. 43,644

2 Claims. (Cl. 18—47.5)

This invention relates to an improvement in the process for making film tubes from normally crystalline vinylidene chloride polymers.

The principal method employed for producing film from normally crystalline polymers of vinylidene chloride has been described by W. T. Stephenson in his copending application, Serial No. 721,738, filed January 13, 1947, now U. S. Patent No. 2,452,080. So far as is here pertinent, that method comprises fusion of the polymer or copolymer, extrusion thereof in tubular form downwardly into a bath of cold water to supercool it while maintaining a column of inert lubricating liquid in that portion of the freshly extruded tube which passes vertically downward into the said bath, conducting the supercooled tube out of the bath and between spaced pairs of pinch rolls, and inflating that portion of the tube between said pinch rolls with such an amount of air that the addition of more air results in no further increase in diameter of the tube but only in elongation of the "bubble" and migration of the stretching zone away from the second set and toward the first set of pinch rolls. Said method is applicable not only to the polymer of vinylidene chloride alone but also to those vinylidene chloride copolymers which are normally crystalline, as determined by X-ray diffraction studies. It applies to extrudable compositions of such normally crystalline polymers, whether plasticized or unplasticized. All such bodies are referred to herein as normally crystalline vinylidene chloride polymers.

One problem which has arisen from the use of the above-described prior method has been due to the tendency of the fully stretched and recrystallized film tube, which becomes flattened in passing through the second set of pinch rolls, to resist reopening to tubular form, due to coherence between opposed internal faces of the flattened tube. Since, for most uses of the film, it is necessary to open the tube prior to filling sections thereof with merchandise or prior to slitting it to form a single film sheet, it is desirable to avoid or overcome its resistance to being opened. The stated problem is particularly acute when handling films made from the copolymer of about 73 per cent vinylidene chloride and 27 per cent vinyl chloride, and is overcome by the hereinafter described invention even with such a film.

It is the principal object of the present invention to provide an improvement in the stated process which will yield the film tube in a readily opened form, i. e. one which will overcome the stated tendency for opposed internal walls of the flattened film tube to stick together. A related object is to provide a treatment for the internal walls of a tube of normally crystalline vinylidene chloride polymer, during the course of its manufacture, so that said tendency toward coherence is overcome. A further object is to provide such a treatment, wherein the agent employed to produce the desired result is one which will not interfere with future welding or heat-sealing operations carried out on such film, and will not weaken the resulting welds or seals.

I have found that the foregoing desired results are obtained when, in accordance with the method described in connection with Fig. 4 of said Stephenson copending application (after which is patterned the drawing herein), the supercooled tube is conducted vertically upward from a lower set of pinch rolls to a higher set, stretching to effect recrystallization occurs between the said sets of rolls, and, according to the present improvement, finely powdered crystalline vinylidene chloride polymer, of composition at least similar to that of the tube, is brought into contact with the internal walls of the tube between said sets of pinch rolls. The polymer powder may be in the form of a loose pile carried within the tube above the nip of the lower set of rolls, or, preferably, it may be contained within a dusting bag carried at the same position within the tube, as illustrated, or carried on the shoulders of the tube in stretching zone "A." The dusting bag, when used, may be made of any cloth sufficiently porous to exude or sift out the fine polymer powder continuously as the tube moves upward past and around the bag. The use of finely ground polymer, as described, prevents the inner tube walls from sticking together when the tube is subsequently collapsed, and the minute coating of polymer powder thereon in no way interferes with subsequent welding or heat-sealing operations, as the powder is of nearly the same composition as the film and becomes an integral part of any seal or weld. It is preferred to use a polymeric powder in the invention having a particle size which will pass a 100 mesh screen, U. S. sieve series, and the finer the powder the more successful is the treatment. The best particle sizes yet tried are those of a few microns or finer. An 8 to 12 ounce supply of polymer powder placed within the tube over the lower pinch rolls is found to last for several hours, and to prevent completely the previously observed and troublesome sticking tendency in the subsequently flattened tube.

The single figure of the annexed drawing illustrates the preferred practice of the invention. A normally crystalline vinylidene chloride polymer is fused and extruded downwardly through a tube-forming orifice of a plastics extruder 10. The freshly formed tube 11 falls directly into a bath of cold water 12 wherein it is supercooled. It is passed through a submerged set of pinch rolls 13, or other constricting means, and a column of oil 14 or similar inert lubricating liquid is carried in the portion of the tube 11 above rolls 13. The flattened and supercooled tube is led around guide roll 15 and thence vertically out of bath 12 and between two sets of pinch rolls 16 and 17 located one set above the other, as shown. When starting operations, the tube is opened and a dusting bag 18 full of finely divided crystalline vinylidene chloride polymer of composition similar to that of the tube is dropped into the tube, coming to rest above the nip between rolls 16. The tube is inflated with air to effect radial distension to from 3 to 5 times the supercooled diameter and until the addition of more air results merely in migration of stretching zone "A" downward toward rolls 16. The fully stretched tube is forwarded in a flattened condition by rolls 17, which operate at a peripheral speed of from 2 to 4 times that of rolls 13, 15, and 16, and is taken up on storage reel 19. Even after being tightly wrapped on reel 19 for prolonged periods, it is found that the tube may be opened easily, whereas a tube so-stored without the internal treatment with polymer powder offers the greatest resistance to being opened.

By the term "polymer of similar composition," as herein employed, is meant a crystalline polymer of vinylidene chloride which is the same as that from which the film tube is made, or, if of different polymeric composition, has a fusion temperature within 10 centigrade degrees of that of the film.

I claim:
1. In a method of making film in tubular form from a normally crystalline vinylidene chloride polymer which comprises forming a supercooled tube of such polymer, conveying it vertically upward between two spaced pairs of pinch rolls, and inflating the tube to effect stretching and recrystallization thereof between said sets of rolls by introducing air thereto under pressure until the introduction of more air results in no further radial expansion of the tube and causes only elongation of the inflated portion of the tube toward the lower pinch rolls, the improvement which consists in maintaining within the tube above the lower pinch rolls a body of finely powdered crystalline vinylidene chloride polymer of composition similar to that of the tube, in effective dusting contact with the inner walls of the tube, thereby to overcome the normal tendency of those walls to stick to one another when the tube is flattened in passing through the upper pinch rolls.

2. In a method of making film in tubular form from a normally crystalline vinylidene chloride polymer which comprises forming a supercooled tube of such polymer, conveying it vertically upward between two spaced pairs of pinch rolls, and inflating the tube to effect stretching and recrystallization thereof between said sets of rolls by introducing air thereto under pressure until the introduction of more air results in no further radial expansion of the tube and causes only elongation of the inflated portion of the tube toward the lower pinch rolls, the improvement which consists in maintaining within the tube above the lower pinch rolls a body of crystalline vinylidene chloride polymer of composition similar to that of the tube and of a particle size to pass a 100 mesh screen, U. S. sieve series, contained in a porous bag through which the powdered polymer may sift into contact with the inner walls of the tube, thereby to overcome the normal tendency of those walls to stick to one another when the tube is flattened in passing through the upper pinch rolls.

KENNETH G. FRANCIS.

No references cited.